Sept. 13, 1960 V. G. O'GORMAN ET AL 2,952,563
METHOD OF CONTROLLING THE FINISHING OF LEATHER
Filed March 1, 1954 2 Sheets-Sheet 1
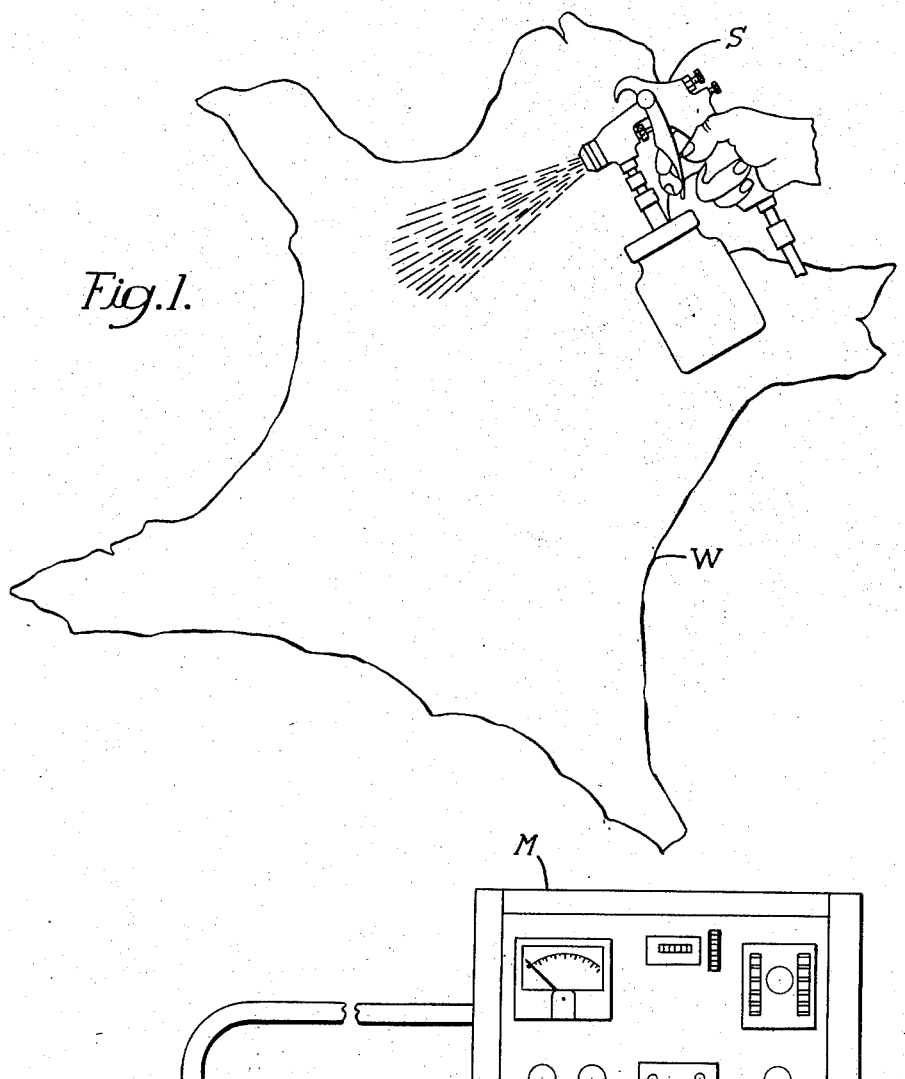
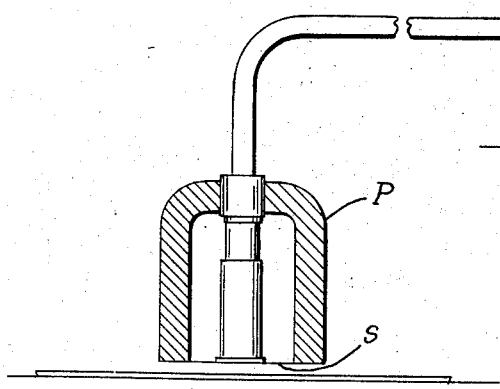
Fig.2.
Inventors
Vincent G. O'Gorman
John G. Hollick
By their Attorney

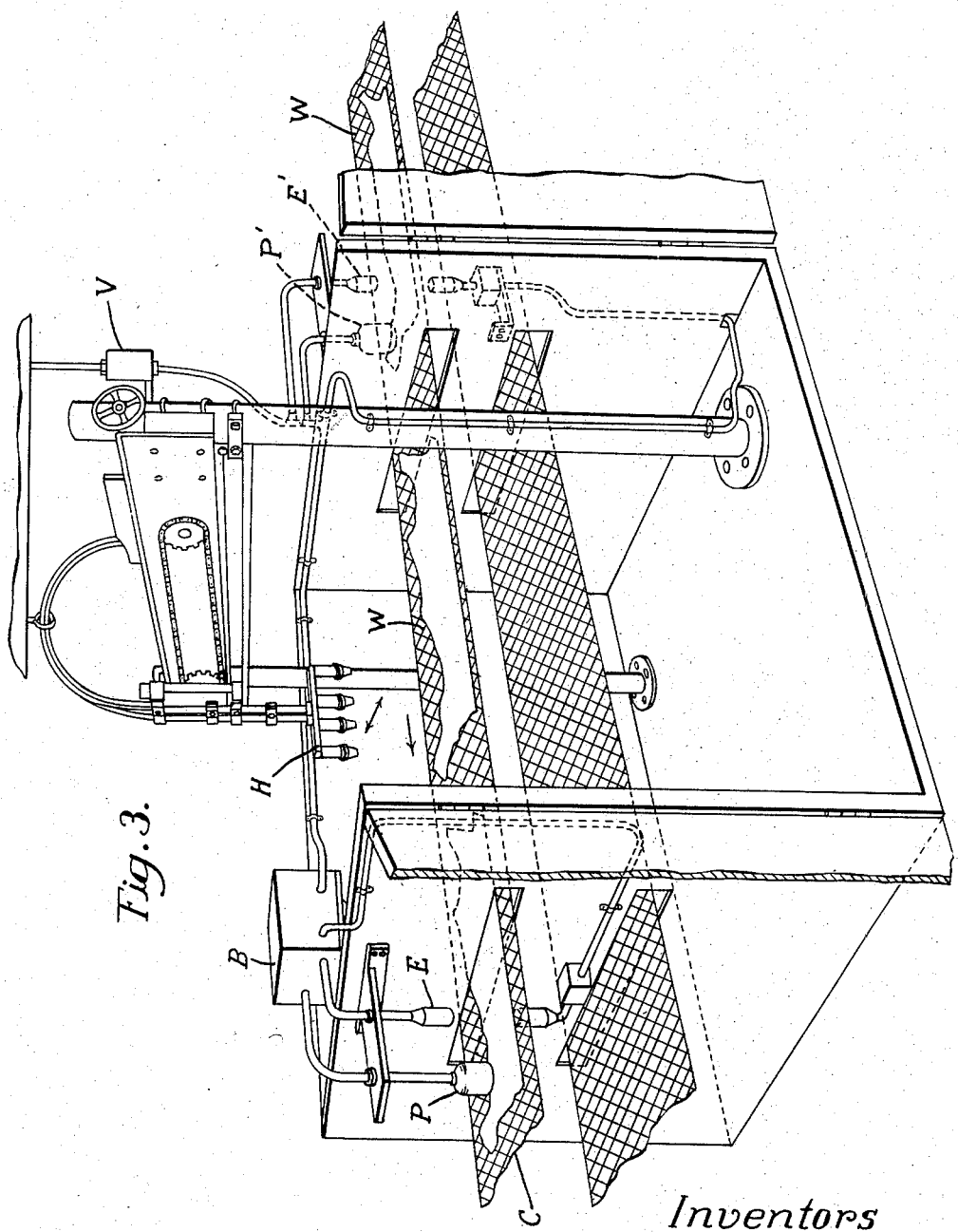

United States Patent Office 2,952,563
Patented Sept. 13, 1960

2,952,563
METHOD OF CONTROLLING THE FINISHING OF LEATHER

Vincent G. O'Gorman and John G. Hollick, Beverly, Mass., assignors to United Shoe Machinery Corporation, Flemington, N.J., a corporation of New Jersey Filed Mar. 1, 1954, Ser. No. 413,145

1 Claim. (Cl. 117—66)

The present invention relates to methods for determining and controlling the amount or thickness of leather coatings and more especially the finishing coatings known as seasoning.

Prior to our invention there has been no way of determining, with any degree of accuracy, the amount or thickness of a coating of seasoning after it has been applied to a leather surface. Furthermore, it has been practically impossible to determine variations in thickness of coating from one portion of a work piece to another. While it might be conveivable to make approximate measurements, the inadequacies of prior methods account for the fact that at the present time there are no accurate statistics concerning this matter available either for research work or production control.

In the finishing of leather it is the usual procedure to apply several coatings of seasoning. Each seasoning coating is composed of different materials in varying proportions and each coating is applied for a definite purpose. For example, the first coating applied is intended to give a basic coverage for the grain surface and is in general composed of a mixture of pigment, resins, casein, dies and wetting agents. Subsequent coatings generally contain less pigment and an increasing proportion of resins. The final coatings in general contain no pigment but do contain a heavy concentration of waxes which impart a gloss to the finished surface. In each coating there is usually a single or critical component which controls the characteristics which are desired to be obtained.

Conventional measuring methods fail in providing a means for measuring the thickness of the seasoning coatings for several reasons, one of which is the nature of the leather surface and the intimate, if not integral, surface bond which the seasoning forms. Thus, it is impossible to separate the coating from the leather so that any method which would contemplate scraping off the deposit and weighing it is not feasible. Likewise, this bond and the irregular contour of the leather surface negate the use of microscopic measurement of leather cross sections. In addition microscopic studies require that the work piece either be destroyed or at least damaged which of course is highly undesirable.

The fibrous nature of leather and the thinness of the coating detract from the use of conventional weighing methods for determining the amount or thickness of the coating. Because of its fibrous nature, the weight of a work piece is greatly influenced by its moisture content. Therefore, as a prerequisite of attempting weight measurements, constant temperature and constant humidity conditions must be established. Even under such conditions weight measurements are of doubtful reliability due to the fact that the weight of the seasoning applied in a single coat (after drying) varies from less than 2 percent to a fraction of 1 percent of the weight of the leather.

In addition none of the conventional methods are adaptable for controlling the application of the seasoning due to the length of time required to carry them out. Furthermore, these methods do not provide a means for determining the amount of critical component deposited. For example, in the first coating, the amount of pigment is the most important ingredient and if its application can be maintained constant then the quantity of the product will likewise be maintained constant. These conventional methods do not afford any practical means for measuring the amount or thickness of subsequent coatings as would be desirable in a fully automatic application system.

It is the primary object of the present invention to provide a method for measuring the thickness or amount of seasoning applied to a leather work piece which enables a rapid and accurate measurement.

It is also an object of the present invention to provide a mehod for determining the amount of critical component of a seasoning compound which has been applied to a leather surface.

It is a further object of the present invention to provide a method for controlling the amount or thickness of seasoning in an automatic applying machine.

Yet another object of the present invention is to provide a method for determining the amount or thickness of each coating of seasoning where several coatings are applied to a leather surface.

More particularly, in accordance with various features of the present invention, radioactive material is added to the seasoning material prior to its application to the leather surface. The "hot" seasoning is then applied to the leather surface in any conventional manner and thereafter, by the use of a Geiger type radiation counter, the number of radiations per minute from a given area are determined. The number of radiations, in turn, give an accurate indication of the amount, or thickness, of the seasoning coating.

In more particularity, and by way of example, magnesium pyrophosphate formulated with the isotope phosphorous-32 is added to the first coating of seasoning which is applied to the leather. As has been mentioned above, pigment is the component of the first coating which is critical or controls the quality of the finished coating. Magnesium pyrophosphate is an inert compound which has essentially the same physical properties of the pigment material. The radioactive compound is ground to the same particle size as the pigment so that when it is added to the seasoning compound it will behave, physically, in the same manner as the pigment. "Hot" magnesium pyrophosphate at a known level of activity is added to a known volume of compound in which the percentage of pigment is likewise known. After this "hot" compound is applied to a leather work piece the number of radiations per minute emanating from a finite area of the work piece will indicate not only the amount of pigment applied to that area but the amount of seasoning, and by knowing the percentage of dry ingredients in the compound the thickness of the dry coat can also be determined.

At the present time the only one method for applying seasoning which can successfully be made fully automatic is the spray method wherein work pieces are carried by a wire mesh conveyor beneath a reciprocating spray head. In accordance with one of the features of the present invention, a radiation sensitive probe is provided above such a conveyor adjacent the exit side of the spray area and is connected to a radiation responsive control circuit which is responsive to variations from a given norm in the amount of radiation detected by the probe. This control circuit proportionately varies one of the variables which affect the amount of seasoning applied by the spray head. Preferably, as is disclosed herein, the control system regulates the atomizing air pressure of the spray nozzles. Detector means are provided which interrupt the action of the control circuit when there is no work piece beneath the probe.

Where it is desired to determine the amount or thickness of subsequent "hot" coatings, it is necessary to account for the presence of the first of such coatings. This can be accomplished in several ways which are disclosed herein. First, since the rate of deterioration of radioactive material is predictable, it is possible to measure the total activity emanating from the leather surface after the second, or subsequent, application, and then merely subtract the radiations attributable to earlier applications which are calculated by allowing for the lapse of time between the applications. Thus, the number of radiations, the amount of critical material, and the amount of seasoning of the later application may be computed. The same result can be accomplished by measuring the number of radiations emanating from the surface before and after the application of a subsequent "hot" application. This method is particularly adapted for use as a control means for the automatic application of the material.

Where it is desired only to apply two "hot" coatings, the second coating can be measured by incorporating in the seasoning material an isotope which emits a different type of ray from the first, as, for example, the first coating could be made by using a beta emitter and the second application could be made using a gamma emitter. The number of gamma radiations could be counted using known equipment, and such measurement would not be affected by the beta radiations which would also be present.

The above and other features of the present invention will now be more particularly described by reference to the accompanying drawings and pointed out in the claims.

In the drawings,

Fig. 1 is a diagrammatic showing of a manual spray application of seasoning to a leather work piece;

Fig. 2 is a diagrammatic showing of apparatus used in counting the number of radiations emanating from the surface of the coated work piece; and Fig. 3 is a diagrammatic showing of an automatic spray seasoning machine with means provided for controlling the amount of seasoning deposited onto work pieces.

There are three conventional methods for applying seasoning to leather. There is a strictly hand method wherein the seasoning is applied by a worker using a plush-covered swab or a spray gun. There is a semi-automatic method wherein the seasoning is applied by a bristle roll to work pieces carried by a conveyor, and workers using swabs even out what has been applied by the roll. Finally, there is the spray method which is usually fully automatic.

As has been pointed out above, the formulation of a seasoning compound varies between different coatings on each work piece and likewise between those used on different types of leather as well as from tannery to tannery. However, certain generalities can be drawn. For example, the first coating generally contains pigment and the amount of pigment deposited by this first coating is the critical ingredient, or the ingredient which controls the quality of that coating, though not in an exclusive manner. While these formulas vary to a great extent, once established a formula is maintained substantially the same. Thus it is possible to determine the percentage of any ingredient therein and also the percentage of dry ingredients. Particular pains are taken in the application of seasoning to insure the application of a homogeneous mixture. Thus, if at any stage it is possible to determine the amount of one ingredient present, it is possible to calculate any, or all, of the other ingredients.

In order to measure the amount of pigment deposited on leather surfaces when the first coat is applied, a radioactive material having the same physical characteristics as the pigment is added to the seasoning compound. In selecting the radioactive material to be added, several factors must be considered. First, the compound must behave physically in a manner very similar to that of the pigment. Secondly, the isotope used in formulating that compound must present no hazard either to the worker or to the ultimate user of the finished leather. To satisfy this latter requirement it is essential that an isotope having a relatively short half life, preferably of one to twenty days, be used so that by the time the product reaches the ultimate consumer there will be little or no detectable radiation. The isotope should preferably be an element which is disposed of by the normal process of body metabolism to prevent any malignant effects if the material is inadvertently ingested. In addition the isotope must have a sufficiently high level of activity so that conventional detecting means will be responsive to its presence. Preferably, a beta emitter should be selected for minimized health hazards. Phosphorus-32 has been selected, by way of example, as an isotope having these desirable qualities. Magnesium pyrophosphate behaves physically in the same manner as most of the pigments used in seasoning compounds when it is ground to the same particle size as the pigment. Magnesium pyrophosphate formulated with the isotope phosphorus-32 is preferably used in carrying out the present phase of this invention.

An amount of "hot" magnesium pyrophosphate having a known level of activity is added to a given volume of seasoning, the formulation of which is recorded. The "hot" seasoning is applied to a leather work piece W in any conventional manner as, for example, by a manually operated spray gun S, as is depicted in Fig. 1. After this application a detector probe P can be positioned above the coated surface in the manner shown in Fig. 2. The radiations emanating from the leather surface are counted by a conventional meter M. This measurement of the number of radiations indicates the amount of radioactive material present on the surface of the leather within an area equal to the area of the screen $s$ of the probe P. From this measurement of radiation it is thus possible to calculate the amount of pigment in that area, the amount of dry materials and the thickness of the application in addition to the total amount of seasoning deposited. For research purposes the amount deposited on different areas of the work piece may be determined or it may be assumed that the measurement obtained indicates the amount deposited per unit of area. The above-described method is excellent for determining the amount or thickness of an application of seasoning for gathering statistics and in studying various aspects of the problems of its proper application as, for example, if it is desirable to know whether different amounts of seasoning are required in different areas of a hide to produce a satisfactory product. However, this method may be modified in the manner which is about to be described so that it may be used automatically to control the application of the seasoning material.

Fig. 3 diagrammatically illustrates an automatic spray seasoning machine of a type which is now commercially utilized. Leather work pieces W are carried by a wire mesh conveyor C past a spray head H which reciprocates transversely of the path of movement of the conveyor as indicated by the arrow. A spray hood H (only the lower portion of which is shown) and exhaust means (not shown) are provided to prevent contamination of the general work area. The amount of seasoning applied by this machine can be controlled by several means, e.g., the pressure of the atomizing air, the speed of the conveyor C, or the rate of reciprocation of the spray head.

For the automatic control of the application of the first coat, magnesium pyrophosphate formulated with the isotope phosphorus-32 is utilized to determine the amount of pigment applied to the leather in a manner similar to that described above. The "hot" seasoning is supplied to the spray head H from a reservoir (not shown) in a conventional manner and applied to the leather work pieces W as they are carried by the conveyor C. A probe P is mounted on the exit side of the hood h to detect the level of activity of each coated work piece. The probe P is connected to a radiation-responsive circuit in the control box B which is actuated when the amount of radiation detected by the probe departs from a given norm. The radiation responsive circuit, when actuated, controls the opening of an atomizing air control valve V through well-known servo mechanism principles and thus the amount of seasoning deposited by the head H is directly controlled to deposit the amount of seasoning required.

A further problem is encountered in controlling the application of seasoning to leather in which individual work pieces must be coated in that there are necessarily spaces between the work pieces as they are laid on the conveyor. To prevent actuation of the control circuit when there is no work piece beneath the probe P, detecting means are provided adjacent said probe. The detecting means illustrated herein comprise a circuit including an electric eye E. This circuit is completed each time there is no work piece beneath the electric eye and is arranged to inactivate the control circuit during this period so that the atomizing pressure is maintained at a constant rate until a subsequent work piece again activates said circuit at which time the level of activity of the work piece will determine whether any adjustment is necessary in the control valve V.

As has previously been mentioned it is necessary, in finishing leather, to apply several coatings of seasoning. It is particularly desirable in an automatic control system to be able to measure the thickness or amount of each successive coating. Where successive layers of "hot" material are applied it is, of course, necessary to account for the activity of previous layers in measuring any particular layer. Below are described three methods for accomplishing this purpose although there are, of course, other variations which can be devised without departing from the spirit of the present invention.

The nature of radioactivity is such that the rate of decay can be predicted with mathematical accuracy. Therefore, where a work piece is coated with a "hot" solution of a known level of activity it is possible to predict the level of activity of that work piece at any time in the future once the level of activity has been measured. Therefore, if the lapse of time between the measurements of first and second coatings of "hot" material is known it is possible to measure the amount of the second coating by measuring the total activity and substracting the activity attributable to the previous coating. In like manner it is possible to determine the thickness of any subsequent coating.

Where only two coatings are to be measured it is possible to determine the amount of the second coating by utilizing in the second coating an isotope which emits a different type of ray. As has been pointed out above, a beta emitter is preferred because of the minimized health hazards. However, it is entirely conceivable to use a gamma emitter which will enable the measurement of the amount of seasoning deposited in the manner described above. Lanthanum-140 is such a gamma-emitting isotope and may be compounded in the form of a lanthanum oxide to behave in a manner similar to that of magnesium pyrophosphate where it is desired to determine the amount of pigment deposited. Therefore, if the second coating contains the "hot" lanthanum oxide and is applied in the manner described for magnesium pyrophosphate it will be possible to determine the amount of pigment in and the thickness of the second coating by using well-known means which are selectively responsive to gamma radiations.

The above-described methods are not particularly adaptable for use in conjunction with an automatic system and for that reason the method about to be described is preferred. In Fig. 3, a second probe P' is shown attached to the hood h adjacent the entrance side of the hood. This probe is connected to a second radiation-responsive circuit in the control box B which automatically accounts for the activity of previous coatings so that the first radiation-responsive circuit is responsive only to the activity measured by the probe P on the exit side of the hood. In a manner similar to that described above, departure of the current application from a given norm causes a variation in the valve V so that at all times the proper amount of material is deposited by the spray head H. Likewise a detector circuit employing an electric eye E' is provided to inactivate the action of the probe P' when there is no work piece beneath the probe.

As has been pointed out above, the amount of pigment in the solution is not at all times the critical component or the component which controls the quality of the application. In some instances it may be the amount of aqueous material deposited or the amount of wax etc. Where it is desired to know the amount of aqueous solution, a soluble salt as, for example, sodium phosphate compounded with the isotope phosphorus-32, is added to the seasoning material and the various methods described above can then be utilized to determine and control the amount of this component applied. Where wax is the critical component a synthetic wax may, by way of example, be compounded with the isotope bismuth-210 and utilized in a similar manner to accomplish the purposes of the present invention.

Having thus described our invention, what we claim as new and desire to secure by Letters Patent of the United States is:

The steps in the method of leather finishing which include the application to the surface of a leather work piece of one coating of a solution of a seasoning compound containing one critical component and a radioactive ingredient which emits one form of radioactive ray, the level of activity of which is in a known ratio to a unit of volume of the compound, applying a second coating of a solution of a seasoning compound containing a second critical component and a radioactive ingredient which emits a second form of radiocative ray, the level of activity of which is in a known ratio to a unit of volume of the second compound, measuring independently the amount of radiation of each of said radioactive ingredients per unit of area emanating from the coatings following their application to determine the amount of seasoning compound applied to the work piece by each of said coatings, and controlling the rate of application of each of said coatings to maintain the amount of seasoning compounds applied within predetermined limits.

References Cited in the file of this patent

UNITED STATES PATENTS

| | | |
|---|---|---|
| 1,327,197 | Byers | Jan. 6, 1920 |
| 1,376,961 | Meade et al. | May 3, 1921 |
| 2,463,733 | Albaugh | Mar. 8, 1949 |
| 2,476,810 | Brunner et al. | July 19, 1949 |
| 2,477,776 | Talbot et al. | Aug. 2, 1949 |
| 2,570,288 | Todd | Oct. 9, 1951 |
| 2,640,788 | Rockett | June 2, 1953 |

OTHER REFERENCES

"Radioactive Isotopes as Tracers," Kramer Power Plant Engineering, November 1947, pages 105–108.

Dall: "Tagged Atoms," Textile World, vol. 98, No. 12, December 1948, pages 103 to 108.